(12) United States Patent
Hurwitz

(10) Patent No.: US 8,708,414 B2
(45) Date of Patent: Apr. 29, 2014

(54) TRAVEL HEADREST

(76) Inventor: Stanley Hurwitz, Richmond (CA)

( * ) Notice: Subject to any disclaimer, the term of this patent is extended or adjusted under 35 U.S.C. 154(b) by 315 days.

(21) Appl. No.: 13/158,625

(22) Filed: Jun. 13, 2011

(65) Prior Publication Data

US 2012/0313417 A1    Dec. 13, 2012

(51) Int. Cl.
*A47C 20/00* (2006.01)
*A47C 7/38* (2006.01)

(52) U.S. Cl.
USPC ........ 297/393; 5/636; 5/639; 5/640; 297/392; 297/397

(58) Field of Classification Search
USPC ............. 297/391, 392, 393, 397; 5/636, 637, 5/639, 640, 645, 643, 644, 655.5
See application file for complete search history.

(56) References Cited

U.S. PATENT DOCUMENTS

| | | | | |
|---|---|---|---|---|
| 941,043 | A | * | 11/1909 | Powell ............................... 5/640 |
| 1,343,357 | A | * | 6/1920 | Eggers ............................... 5/654 |
| 2,522,120 | A | | 9/1950 | Kaskey et al. |
| 3,604,026 | A | * | 9/1971 | Scheips ........................ 297/397 |
| 4,031,578 | A | | 6/1977 | Sweeney et al. |
| 4,236,264 | A | * | 12/1980 | Britzman .......................... 5/640 |
| 4,285,081 | A | | 8/1981 | Price |
| 4,617,691 | A | | 10/1986 | Monti et al. |
| 4,679,262 | A | | 7/1987 | Davis et al. |
| 4,679,263 | A | * | 7/1987 | Honer .............................. 5/640 |
| 4,738,488 | A | | 4/1988 | Camello |
| 4,776,049 | A | * | 10/1988 | Perron ............................. 5/640 |
| 5,271,114 | A | * | 12/1993 | Kjersem .......................... 5/640 |
| 5,519,906 | A | * | 5/1996 | Fanto-Chan ..................... 5/631 |
| 5,682,632 | A | | 11/1997 | Cotroneo |
| 6,009,577 | A | * | 1/2000 | Day .................................. 5/636 |
| 6,122,784 | A | | 9/2000 | Hurwitz |
| 6,230,349 | B1 | | 5/2001 | Silver et al. |
| 6,412,127 | B1 | * | 7/2002 | Cuddy ............................. 5/632 |
| 6,457,195 | B1 | * | 10/2002 | Holste ............................. 5/636 |
| 6,539,568 | B2 | * | 4/2003 | Lee, Jr. ............................ 5/644 |
| 6,641,221 | B1 | * | 11/2003 | Kastlunger ................... 297/397 |
| 6,807,697 | B2 | * | 10/2004 | Druery et al. .................... 5/650 |
| 6,860,563 | B1 | * | 3/2005 | Semsch et al. ............... 297/397 |
| D522,300 | S | | 6/2006 | Roberts |
| 7,195,660 | B2 | | 3/2007 | Little et al. |
| 7,213,883 | B2 | | 5/2007 | Charnitski |
| 7,587,773 | B2 | * | 9/2009 | Littlehorn et al. ............... 5/655 |
| 7,644,990 | B2 | | 1/2010 | Pearson |

(Continued)

OTHER PUBLICATIONS

International Search Report issued against PCT/CA2012/050395.

(Continued)

*Primary Examiner* — David R Dunn
*Assistant Examiner* — Richard Lowry
(74) *Attorney, Agent, or Firm* — Cameron IP

(57) ABSTRACT

A travel headrest comprises a right side and a left side. The right side of the headrest includes a right side occipital support portion and a right side mandible portion which extends outwardly from the right side occipital support portion. When a person leans against the right side occipital portion the right side mandible support portion exerts a force against the person's mandible and thereby provides support to the mandible. The left side of the headrest includes a left side occipital support portion and a left side mandible portion which extends outwardly from the left side occipital support portion. When a person leans against the left side occipital portion the left side mandible support portion exerts a force against the person's mandible and thereby provides support to the mandible.

18 Claims, 10 Drawing Sheets

(56) References Cited

U.S. PATENT DOCUMENTS

| | | | |
|---|---|---|---|
| 7,657,955 B1 * | 2/2010 | Alvistur et al. | 5/655 |
| 7,669,265 B2 | 3/2010 | Weise | |
| 7,832,036 B2 * | 11/2010 | Littlehorn et al. | 5/655 |
| 2003/0226207 A1 | 12/2003 | Lowenthal | |
| 2005/0173962 A1 | 8/2005 | Stein et al. | |
| 2005/0278853 A1 * | 12/2005 | Littlehorn et al. | 5/636 |
| 2008/0034504 A1 | 2/2008 | Schmidt | |
| 2008/0104764 A1 * | 5/2008 | Chen | 5/644 |
| 2008/0189863 A1 * | 8/2008 | Zappas | 5/636 |
| 2008/0271249 A1 * | 11/2008 | Deetsch | 5/640 |
| 2009/0013471 A1 | 1/2009 | Yang | |
| 2009/0019641 A1 | 1/2009 | Ali | |
| 2010/0205744 A1 | 8/2010 | Edwards et al. | |

OTHER PUBLICATIONS

Written Opinion of the International Searching Authority issued against PCT/CA2012/050395.

* cited by examiner

TRAVEL HEADREST

BACKGROUND OF THE INVENTION

1. Field of the Invention

The present invention relates to a travel headrest and, in particular, to a travel headrest for use by a person sitting upright in a high-backed seat.

2. Description of the Related Art

The need for a travel headrest for supporting the head of a person while the person is seated in a high-backed seat and is in a relaxed, dozy or even sleeping state has been previously recognized and various head supports have been developed for this purpose.

For example, U.S. Pat. No. 6,122,784 issued on Sep. 26, 2000 to Stanley Hurwitz, and the full disclosure of which is incorporated herein by reference, discloses a travel headrest which is capable of supporting a person's head along at least a major portion of the height of the head while, at the same time, fitting under and supporting a person's chin and cheek and, also, being retained by a portion of the head support nestled against an opposite side of the person's head. The travel headrest has first and second head cushions each having a top portion, a bottom portion, and opposite sides. The first and second head cushions are elongate from the top portions to the bottom portions thereof. The second head cushion portion further includes an intermediate portion between its top portion and bottom portion. A flexible connecting portion interconnects the first head cushion and the intermediate portion of the second head cushion. The top portion and bottom portion of the second head cushion project upwardly and downwardly, respectively, from both the intermediate portion and the flexible connecting portion. The cushions may be stuffed or inflatable.

There however remains a need for an improved travel headrest for supporting the head of a person while the person is seated in a high-backed seat.

SUMMARY OF THE INVENTION

It is an object of the present invention to provide an improved travel headrest.

It is another object of the present invention to provide an improved travel headrest for use by a person sitting upright in a high-back seat on an aircraft or land vehicle.

There is accordingly disclosed a travel headrest comprising a right side and a left side. The right side of the headrest is formed from a substantially kidney shaped right side cushion having a concave edge and a convex edge opposite of the concave edge. The right side cushion is twisted such that a point on the concave edge of the right side cushion is connected to a point on the convex edge of the right side cushion to define a right side occipital support portion and a right side mandible support portion. The right side occipital support portion has a front and a rear. The right side mandible support portion extends outwardly from the front of the right side occipital support portion. The left side of the headrest is formed from a substantially kidney shaped left side cushion having a concave edge and a convex edge opposite of the concave edge. The left side cushion is twisted such that a point on the concave edge of the left side cushion is connected to a point on the convex edge of the left side cushion to define a left side occipital support portion and a left side mandible support portion. The left side occipital support portion has a front and a rear. The left side mandible support portion extends outwardly from the front of the left side occipital support portion.

In a first more specific embodiment the right side cushion and the left side cushion of the headrest each include a fabric covering seamed together to define a closed pocket filled with a stuffing material. The headrest may further include a stiffening pad disposed on the front of the occipital support portion of at least one of the right side of the headrest and the left side of the headrest. The headrest may also further include a non-slip pad disposed on the rear of the occipital support portion of at least one of the right side of the headrest and the left side of the headrest. There may be a fastener for releasably connecting a distal end of the right side mandible support portion to a distal end of the left side mandible support portion. A web may connect the right side occipital support portion and the left side occipital support portion.

In a second more specific embodiment the right side cushion and the left side cushion each include a fabric covering seamed together to define a closed pocket filled with an inflatable bladder. The inflatable bladder of the right side cushion of the headrest may be in fluid communication with the inflatable bladder of the left side cushion of the headrest. There may be a valve disposed between the inflatable bladder of the right side cushion of the headrest and the inflatable bladder of the left side cushion of the headrest. An oral inflation tube may be provided for inflating the inflatable bladders.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
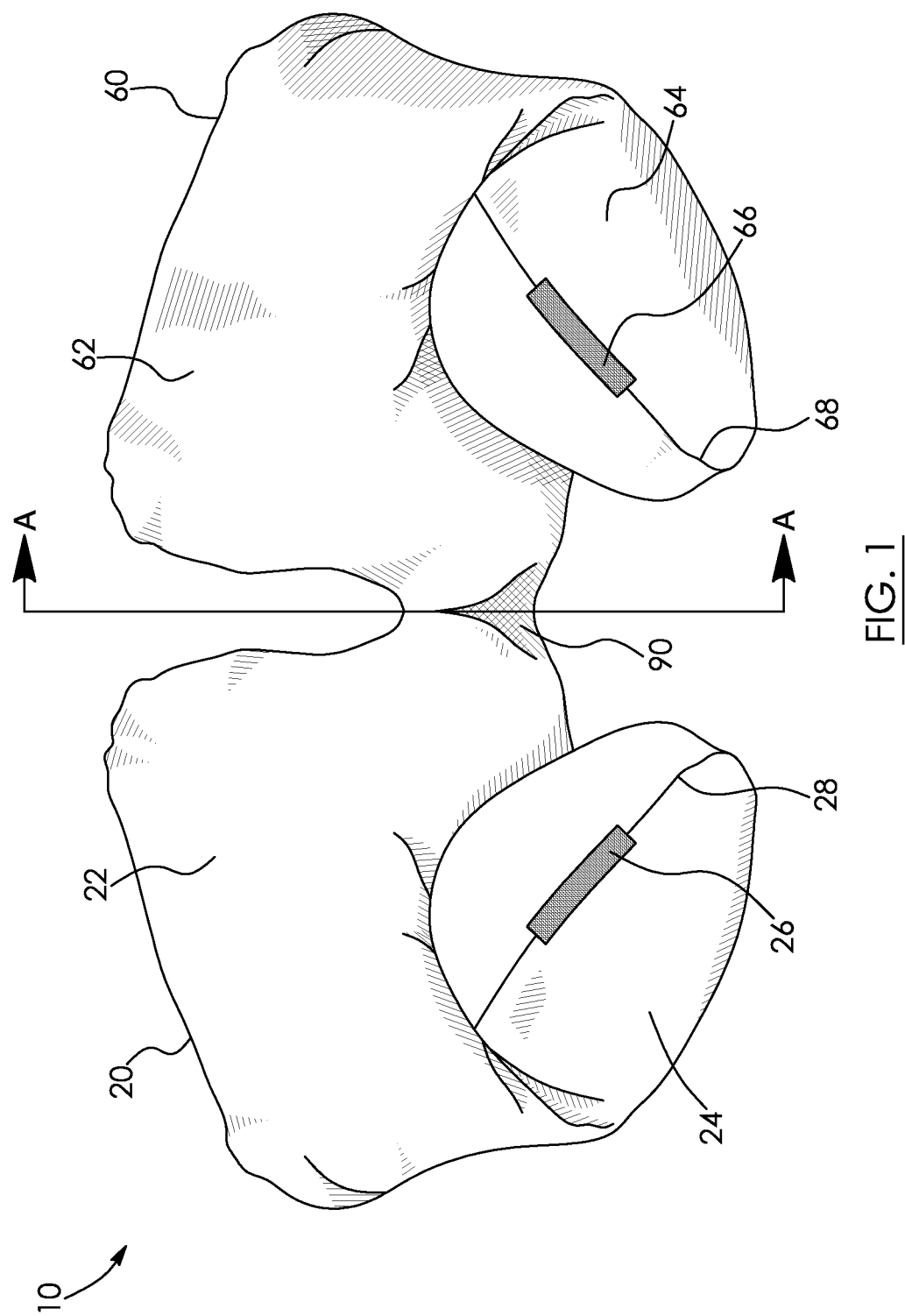
FIG. 1 is a front view of a first embodiment of an improved travel headrest.
Figure 9:
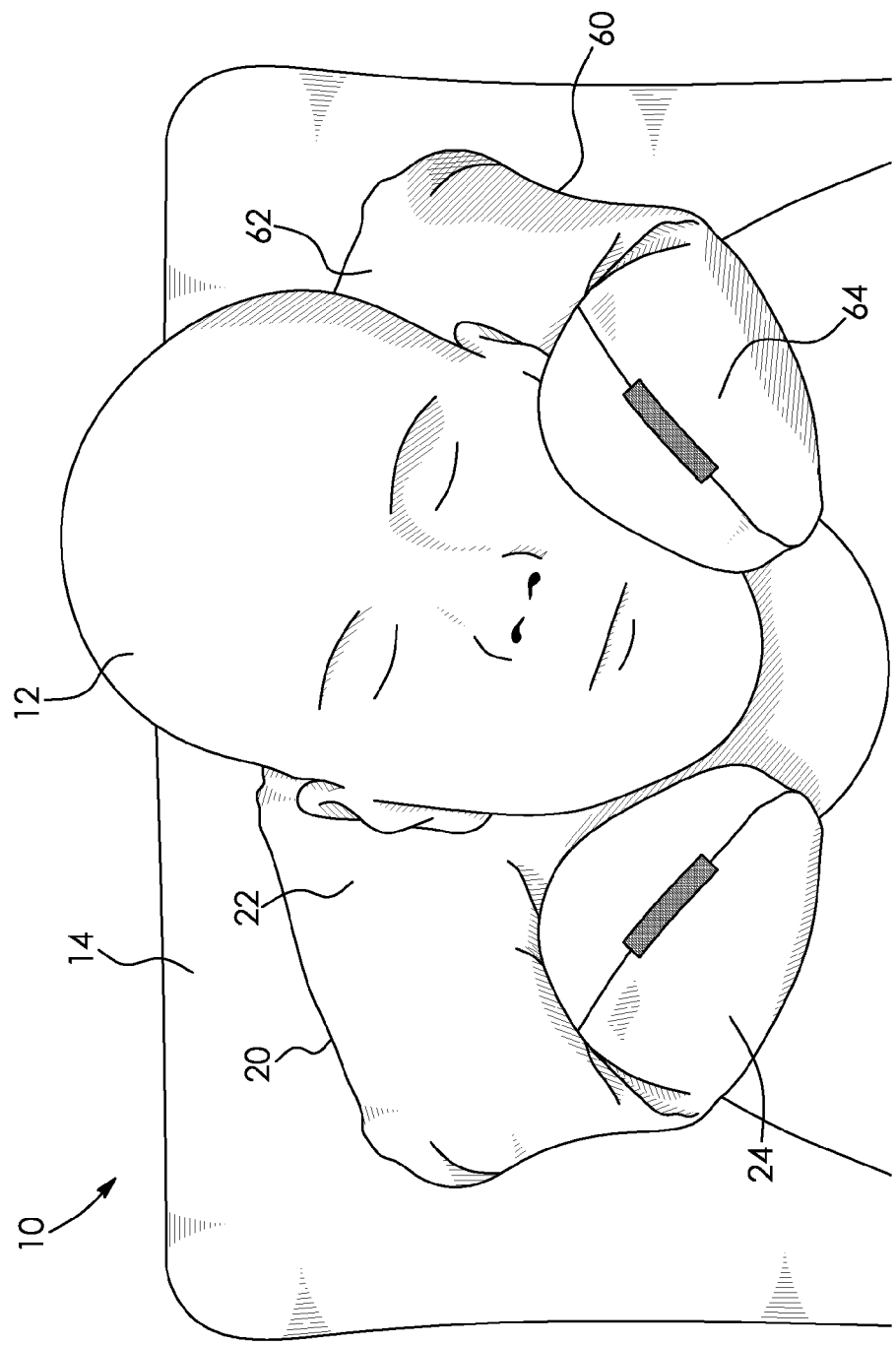
FIG. 9 is a front view showing the travel headrest of FIG. 1 in use.

Referring to the drawings and first to FIG. 1 this shows a first embodiment of an improved travel headrest 10. As shown in FIG. 9, the headrest 10 is for use by a person 12 sitting upright in a high-back seat 14 on an aircraft or land vehicle (not shown).

Figure 10:
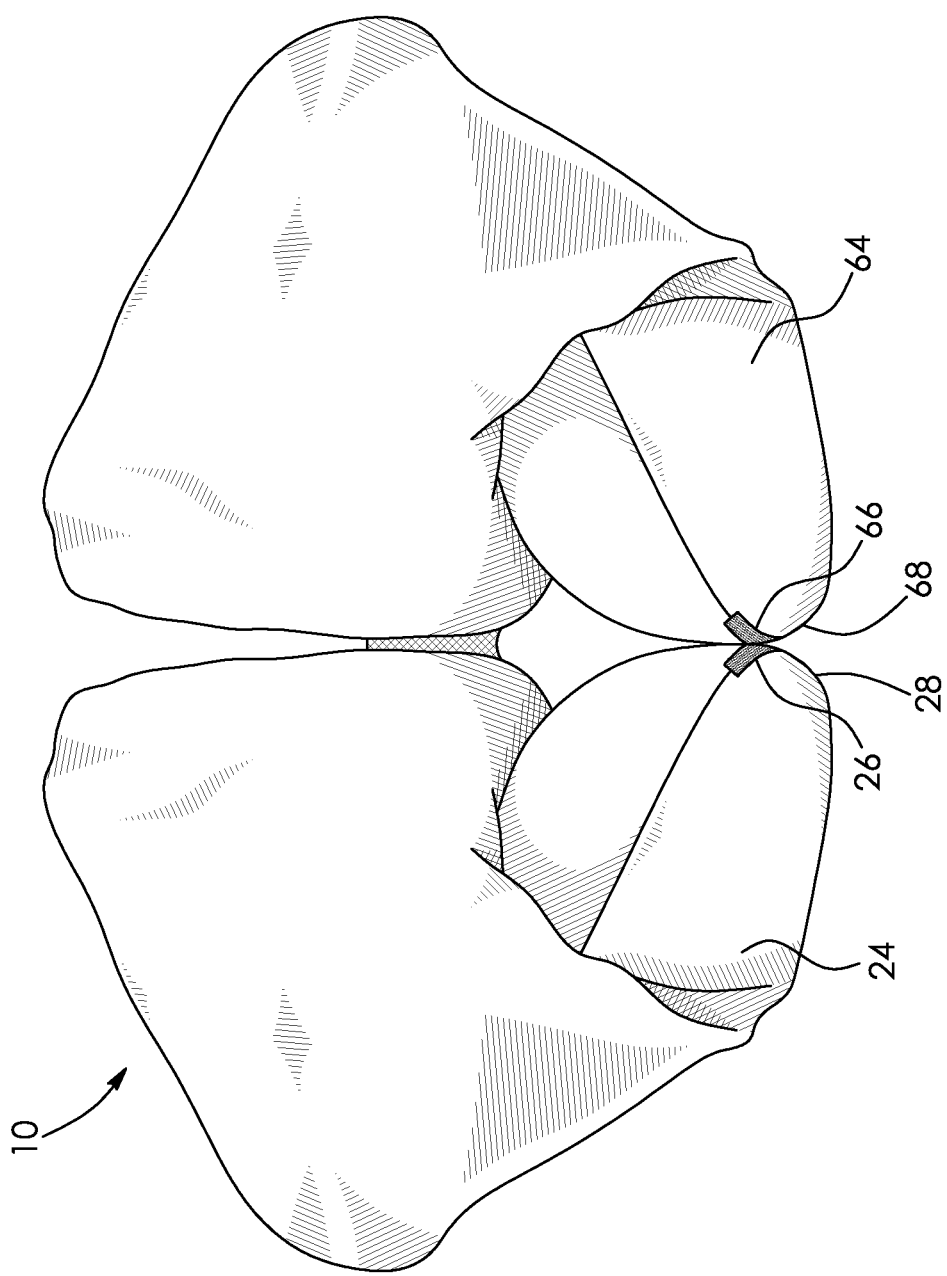
FIG. 10 is a top view showing the travel headrest of FIG. 1 in a substantially annular configuration for use as a pillow.

Referring back to FIG. 1, the headrest 10 has a right side 20 and a left side 60. The right side 20 of the headrest 10 includes an occipital support portion 22 and a mandible support portion 24 which extends outwardly from the occipital support portion 22. Likewise the left side 60 of the headrest 10 includes an occipital support portion 62 and a mandible support portion 64 which extends outwardly from the occipital support portion 62 thereof. Fasteners 26 and 66 are disposed on respective distal ends 28 and 68 of the mandible support portions 24 and 64. In this example the fasteners 26 and 66 are in the form of hook and loop fastener strips of the type sold under the trademark VELCRO®. However, in other embodiments, other suitable fasteners may be used. The fasteners 26 and 66 allow the distal ends 28 and 68 of the mandible support portions 24 and 64 to be connected to form a substantially annular structure which is shown in FIG. 10 and which may be used as a pillow, for example, by a person laying on the floor at an airport during a layover or flight delay.

Figure 2:
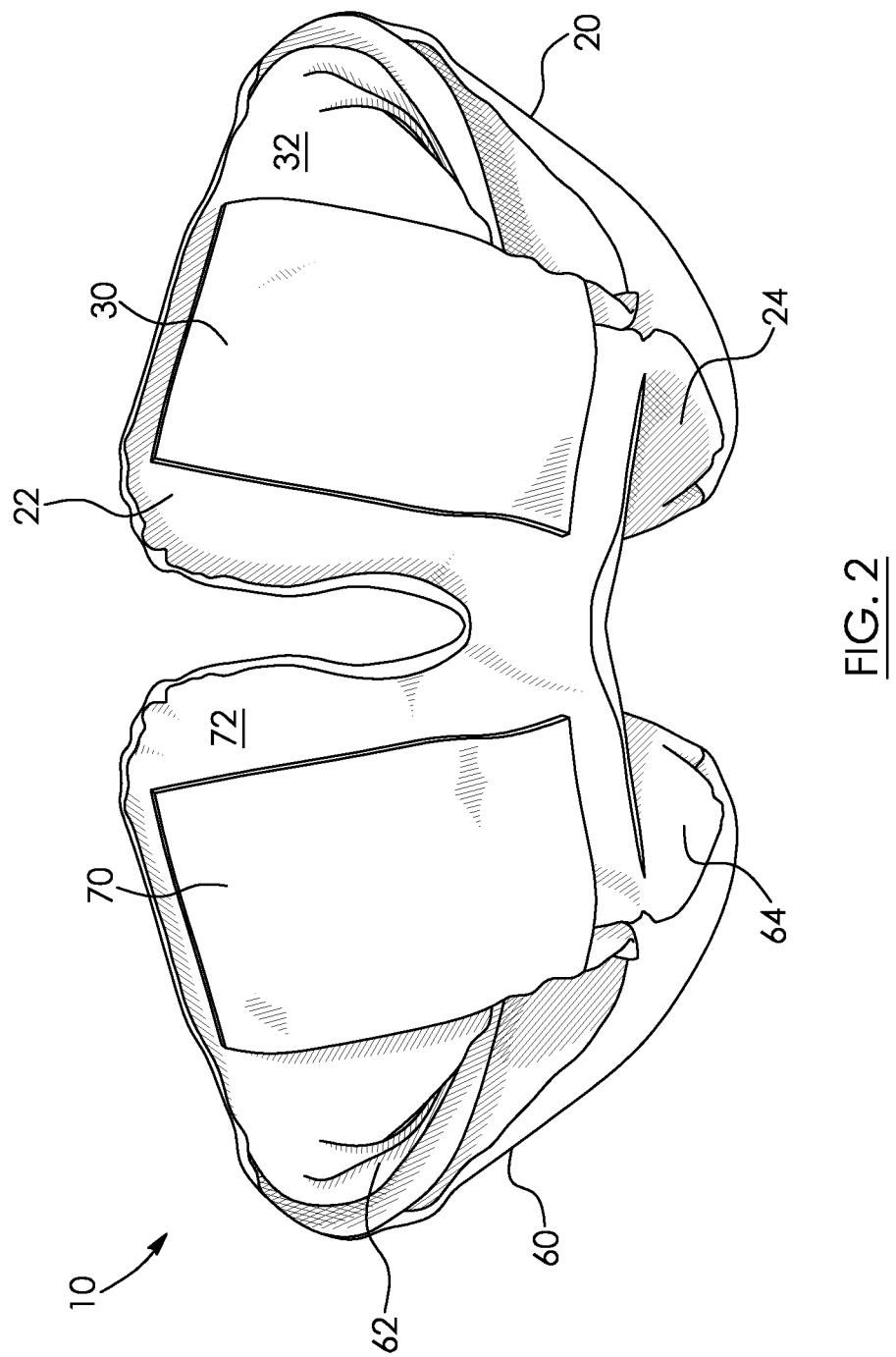
FIG. 2 is a rear view of the travel headrest of FIG. 1.

Referring now to FIG. 2, there is a non-slip pad 30 disposed on a rear 32 of the right side 20 of the headrest 10. The non-slip pad is designed to prevent the headrest from slipping along the high-back seat 14, shown in FIG. 9, when the headrest 10 is in use. There is also a non-slip pad 70 disposed on a rear 72 of the left side 60 of the headrest 10. The left side 60 of the headrest is shown in greater detail in FIGS. 3 and 4.

Figure 3:
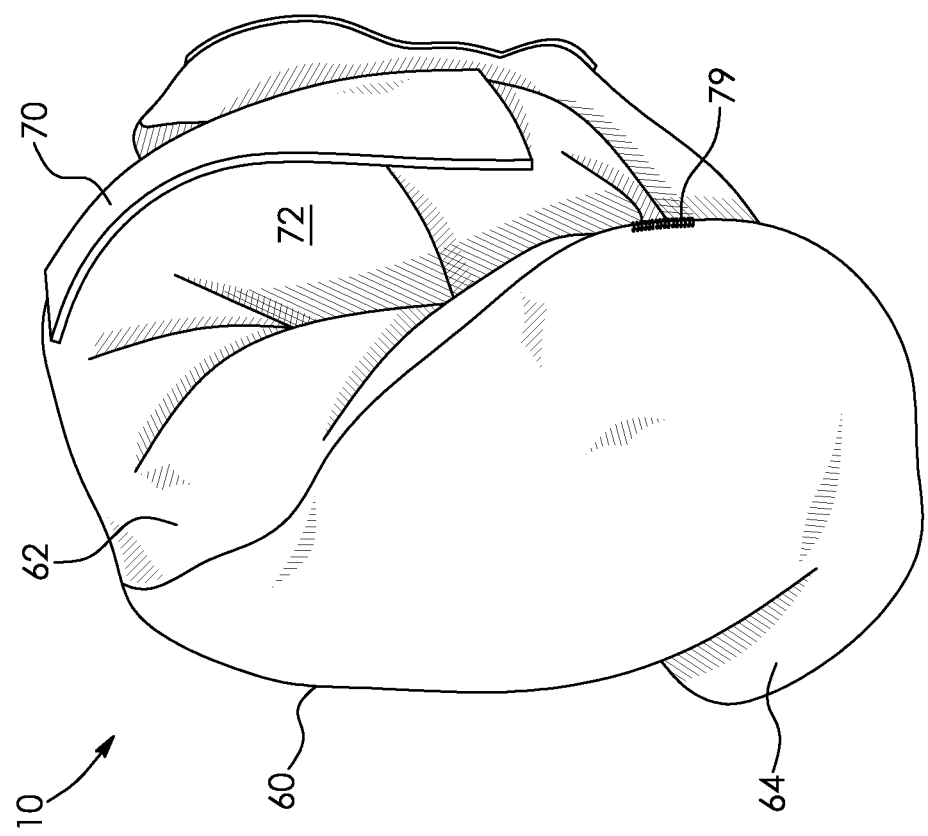
FIG. 3 is an end view of the travel headrest of FIG. 1.
Figure 4:
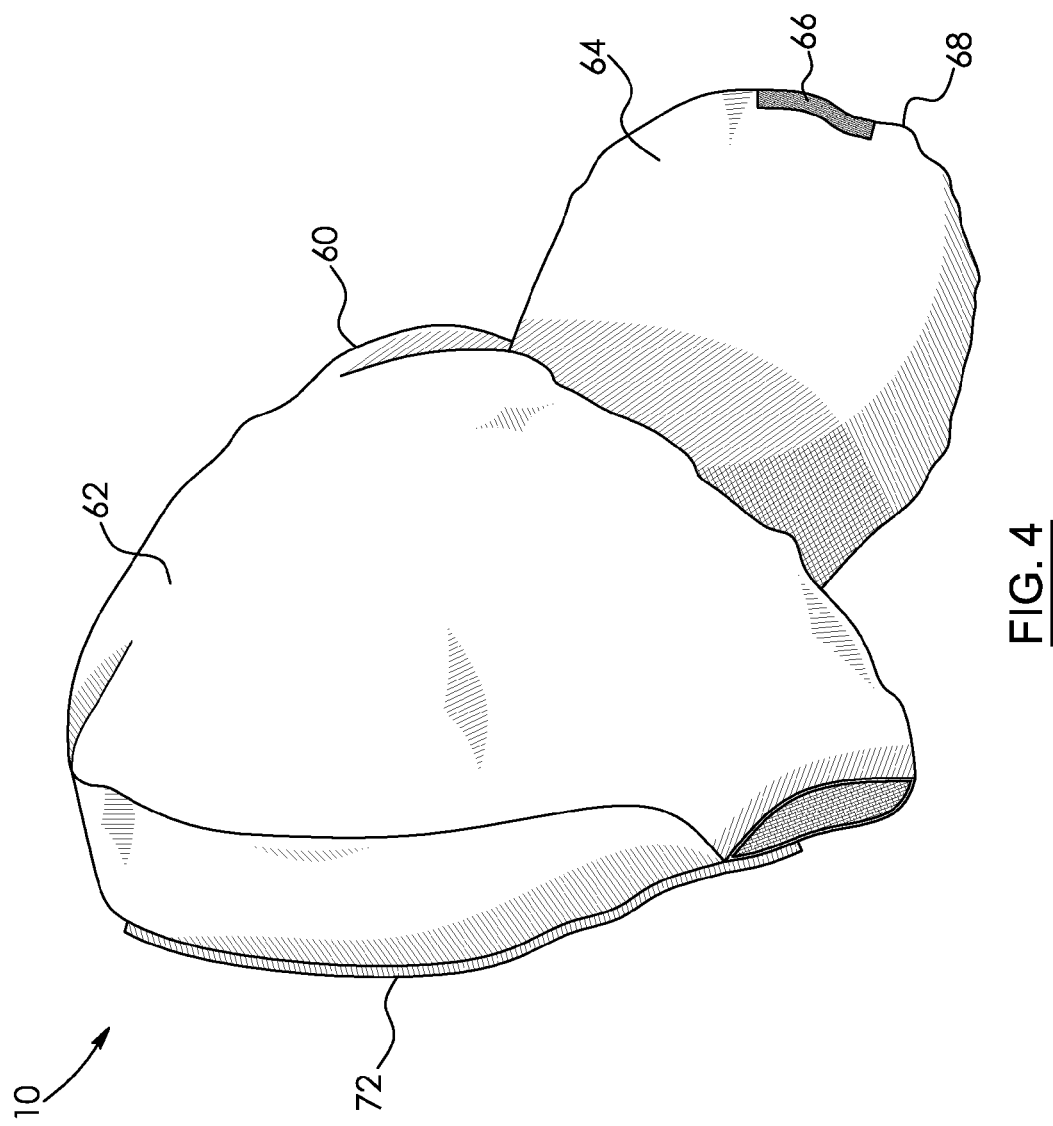
FIG. 4 is a sectional view of the travel headrest of FIG. 1 taken along line A-A of FIG. 1.
Figure 5:
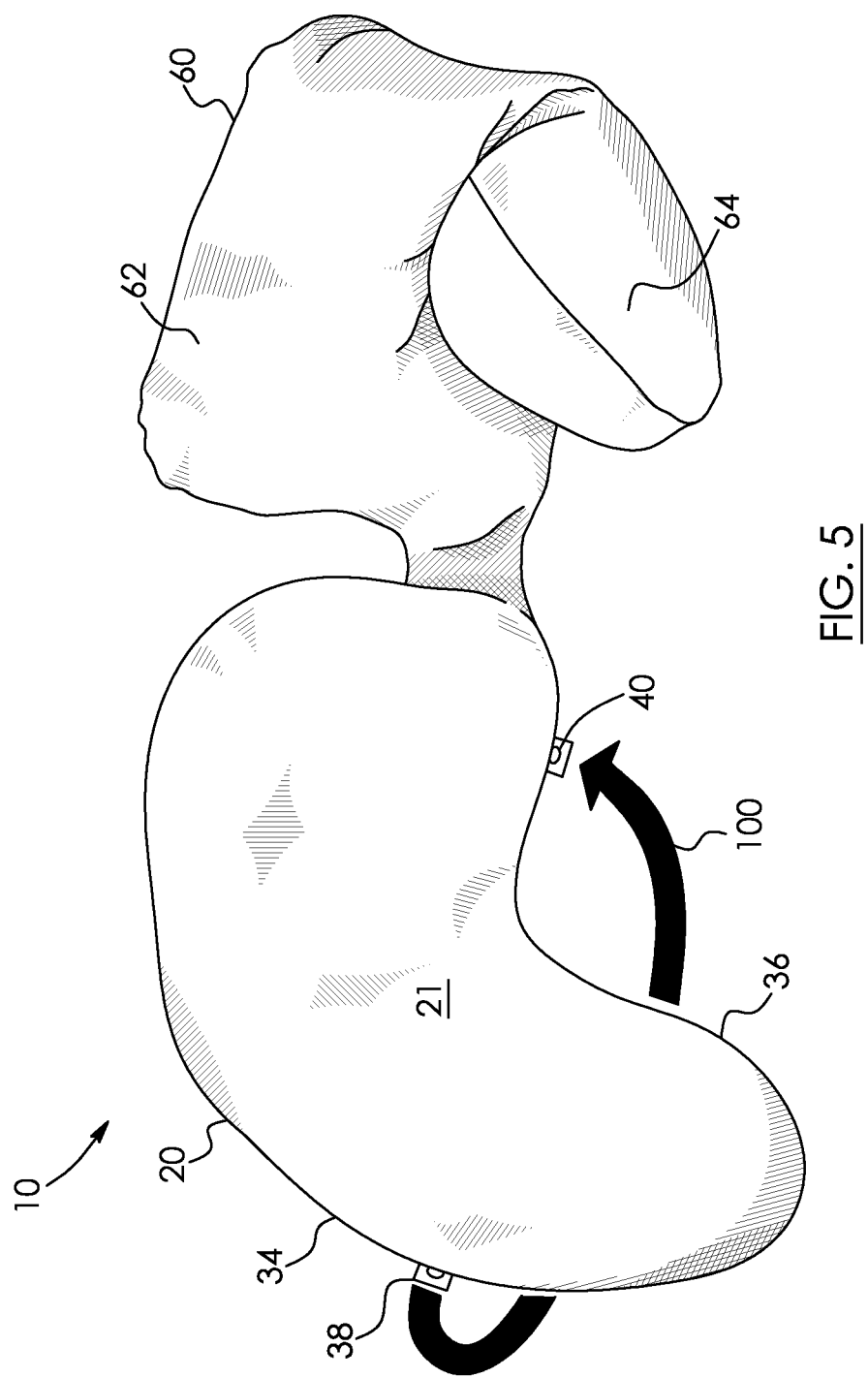
FIG. 5 is a front view of the travel headrest of FIG. 1 showing a right side of the headrest in a deformed condition.

The right side 20 and left side 60 of the headrest 10 are formed from a unitary cushion 21, which is kidney shaped in this example as shown in FIG. 5, for the right side 20 of the headrest 10. The cushion 21 has a first longitudinal edge which, in this example, is a convex edge 34 and a second longitudinal edge which, in this example, is a concave edge 36 opposite of the convex edge 34. The cushion 21 is twisted, as indicated by arrow 100, so that a point of connection 38 on the convex edge 34 of the cushion 21 is connected to a point of connection 40 on the concave edge 36 of the cushion 21. The connection between the points of connection 38 and 40 may be releasable or fixed. As shown in FIG. 5 for the left side 60 of the headrest 10, twisting a cushion in the above-described manner causes the mandible support portion 64 to form and extend outwardly from the occipital support portion 62. In particular, and as shown in FIG. 3, the mandible support portion 64 extends outwardly from a stitched connection 79 between the concave and convex edges of the kidney shaped cushion.

Figure 6:
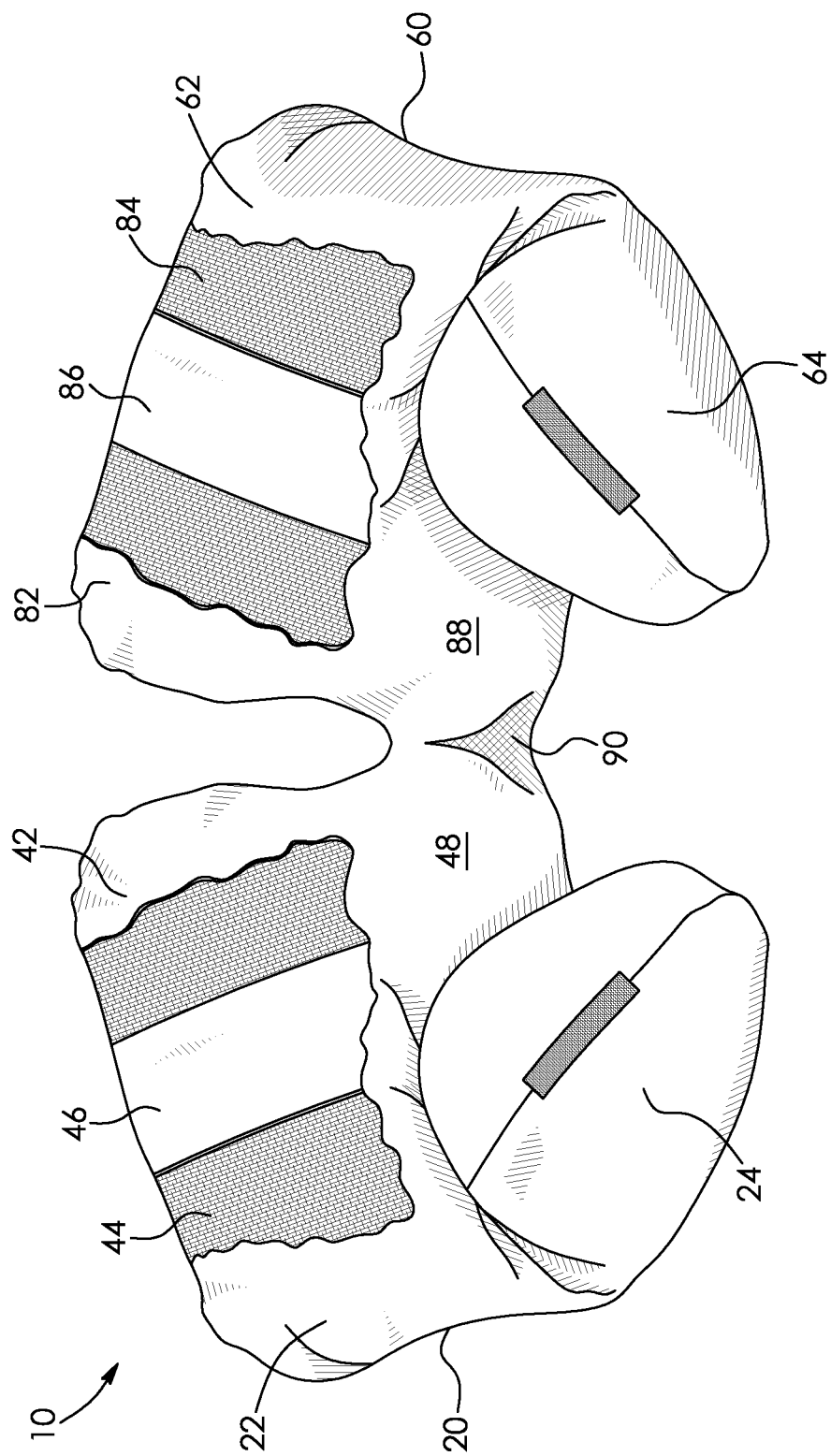
FIG. 6 is a front, partially sectional, view of the travel headrest of FIG. 1 showing a stiffening pad and stuffing material thereof.

Referring now to FIG. 6, in this example, the right side 20 and left side 60 of the headrest 10 are connected by a web 90 of fabric material. The right side 20 of the headrest 10 includes a covering 42 of fabric material seamed together to form a closed pocket filled with a stuffing material 44. The fabric material may be a vinyl material. There is a stiffening pad 46 disposed on a front 48 of the occipital support portion 22. The stiffening pad 46 is between the covering 42 and the stuffing material 44. Likewise the left side 60 of the headrest 10 includes a covering 82 of fabric material seamed together to form a closed pocket filled with a stuffing material 84. There is also a stiffening pad 86 disposed on a front 88 of the occipital support portion 62. The stiffening pad 86 is between the covering 82 and the stuffing material 84. The stiffening pads 46 and 86 provide additional support to the back of a person's head when the headrest 10 is in use.

Figure 7:
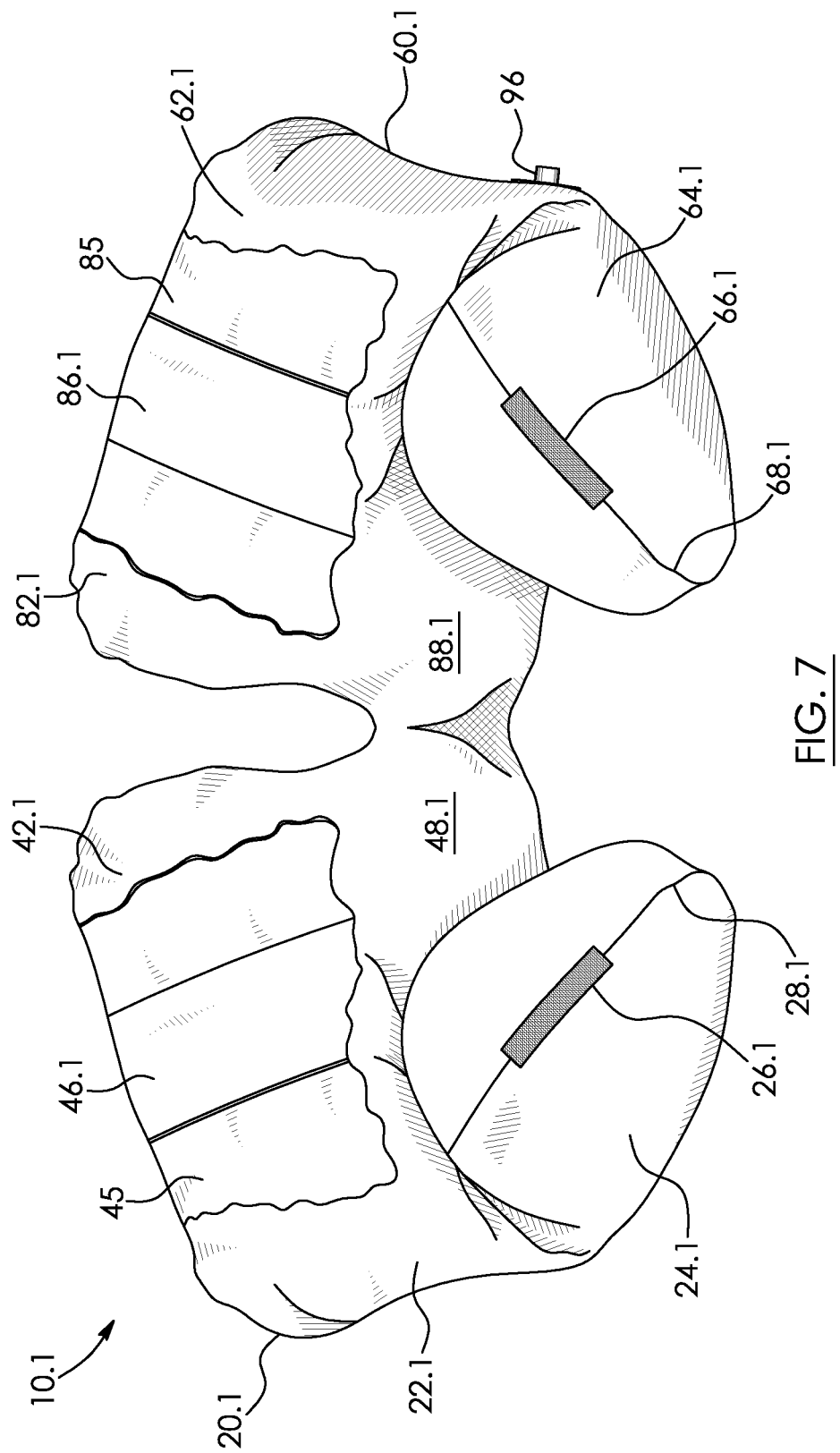
FIG. 7 is a front, partially sectional, view of a second embodiment of an improved travel headrest showing a stiffening pad and inflatable bladders thereof.
Figure 8:
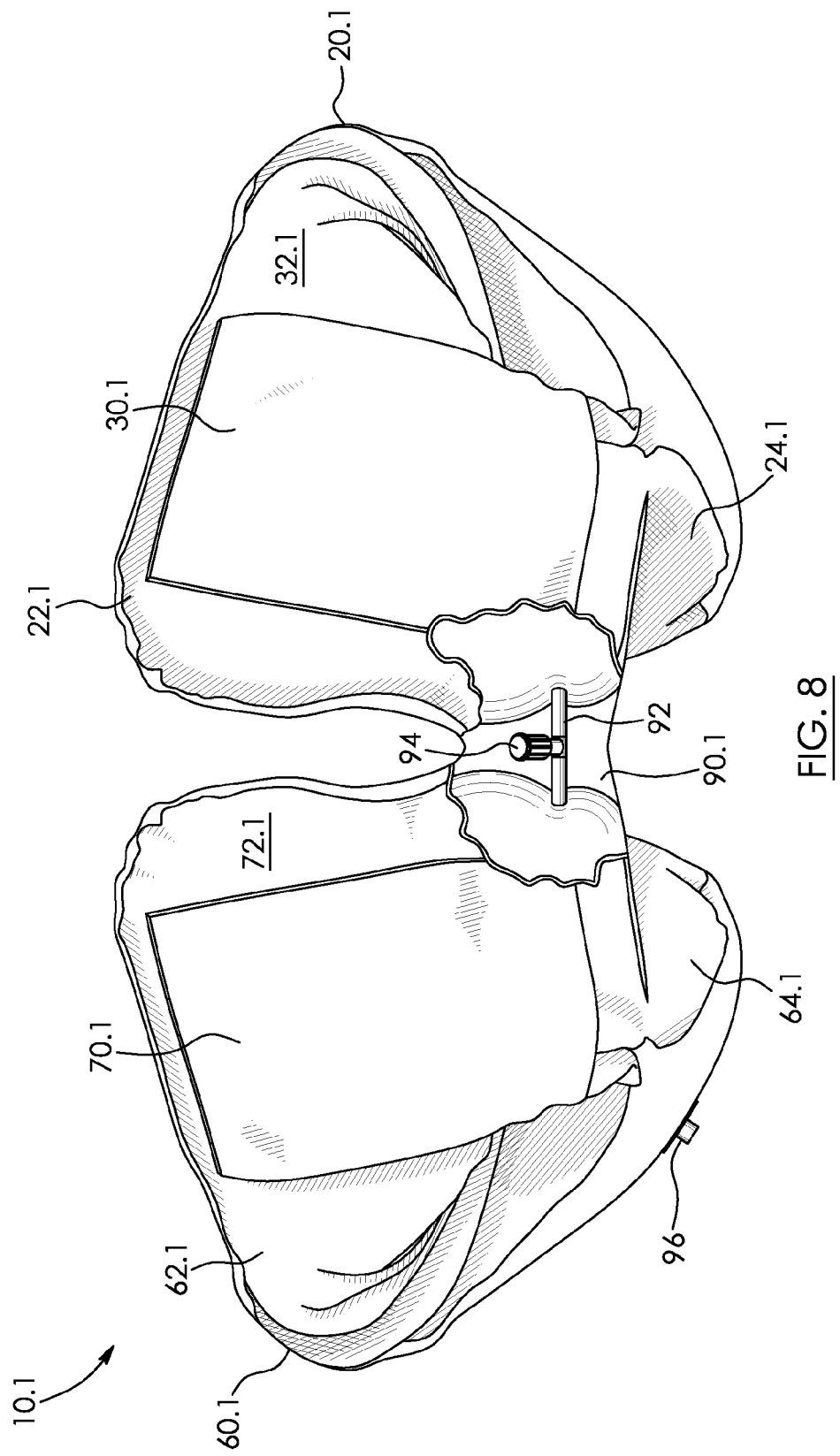
FIG. 8 is a front, partially sectional, view of the travel headrest of FIG. 7 showing a valve disposed between the inflatable bladders thereof.

Referring now to FIGS. 7 and 8, a second embodiment of an improved travel headrest 10.1 is shown. The second embodiment of the headrest 10.1 is generally similar to the first embodiment of the headrest 10, and in FIGS. 7 and 8 like parts have been given like reference numerals as in FIGS. 1 to 6 with the additional numerical designation "0.1". However, the second embodiment of the headrest 10.1 is inflatable rather than stuffed. In particular, and as shown in FIG. 7, the right side 20.1 of the headrest 10.1 includes a covering 42.1 of fabric material seamed together to form a closed pocket within which an inflatable bladder 45 is disposed. There is a stiffening pad 46.1 disposed on a front 48.1 of the occipital support portion 22.1. The stiffening pad 46.1 is between the covering 42.1 and the inflatable bladder 45. Likewise the left side 60.1 of the headrest 10.1 includes a covering 82.1 of fabric material seamed together to form a closed pocket within which an inflatable bladder 85 is disposed. There is also a stiffening pad 86.1 disposed on a front 88.1 of the occipital support portion 62.1. The stiffening pad 86.1 is between the covering 82.1 and the inflatable bladder 85. There is an oral inflation tube 96 for inflating the bladders 45 and 85.

As shown in FIG. 8, there is a conduit 92 extending between the inflatable bladder 45 of the right side 20.1 of the headrest 10.1 and the inflatable bladder 85 of the left side 60.1 of the headrest 10.1. The conduit 92 allows fluid communication between the inflatable bladder 45 of the right side 20.1 of the headrest 10.1 and the inflatable bladder 85 of the left side 60.1 of the headrest 10.1. There is a valve 94 disposed along the conduit 92 between the inflatable bladders 45 and 85. The valve 94 allows a person to selectively adjust the volume of fluid in each of the bladders 45 and 85. This is particularly useful when the headrest 10.1 is used on an aircraft where changes in cabin pressure may result in changes in the volume of air in the bladders 45 and 85 and cause the headrest 10.1 to partially deflate. In such a situation a person, who leans their head towards the left, may open the valve 94 and apply a compressive force to the right side 20.1 of the headrest 10.1 to cause air from the right side 20.1 of the headrest 10.1 to flow to the left side 60.1 of the headrest 10.1, thereby reinflating the left side 60.1 of the headrest 10.1 without the need to use the oral inflation tube 96. Closing the valve 94 keeps the left side 60.1 of the headrest 10.1 inflated. Conversely, the right side 20.1 of the headrest 10.1 may be reinflated by applying a compressive force to the left side 60.1 of the headrest 10.1 when the valve 94 is open.

In use, and as shown in FIG. 9, when a person 12 leans against the occipital support portion 62 of the left side 60 of the headrest 10 this causes the mandible support portion 64 of the left side 60 of the headrest 10 to exert a force against the person's mandible and thereby provide support to the mandible. Likewise when a person 12 leans against the occipital portion 22 of the right side 20 of the headrest 10 this causes the mandible support portion 24 of the right side 20 of the headrest 10 to exert a force against the person's mandible and thereby provide support to the mandible.

It will be understood by a person skilled in the art that many of the details provided above are by way of example only, and are not intended to limit the scope of the invention which is to be determined with reference to the following claims.

What is claimed is:

1. A travel headrest comprising:
   a right side formed from a right side cushion, the right side cushion having a first longitudinal edge and a second longitudinal edge opposite of the first longitudinal edge, the right side cushion being twisted such that a point on the first longitudinal edge of the right side cushion is connected to a point on the second longitudinal edge of the right side cushion so as to define a right side occipital support portion and a right side mandible support portion which extends outwardly from the right side occipital support portion, the right side occipital support portion having a front and a rear, and the right side mandible support portion extending outwardly from the front of the right side occipital support portion; and
   a left side formed from a left side cushion, the left side cushion having a first longitudinal edge and a second longitudinal edge opposite of the first longitudinal edge, the left side cushion being twisted such that a point on the first longitudinal edge of the left side cushion is connected to a point on the second longitudinal edge of the left side cushion so as to define a left side occipital support portion and a left side mandible support portion which extends outwardly from the left side occipital support portion, the left side occipital support portion having a front and a rear, and the left side mandible support portion extending outwardly from the front of the left side occipital support portion.

2. The travel headrest as claimed in claim 1 wherein the right side cushion and the left side cushion each include a fabric covering seamed together to define a closed pocket filled with a stuffing material.

3. The travel headrest as claimed in claim 1 further including a stiffening pad disposed on at least one of the front of the right side occipital support portion and the front of the left side occipital support portion.

4. The travel headrest as claimed in claim 1 further including a non-slip pad disposed on at least one of the rear of the right side occipital support portion and the rear of the left side occipital support portion.

5. The travel headrest as claimed in claim 1 further including a fastener for releasably connecting a distal end of the right side mandible support portion and a distal end of the left side mandible support portion.

6. The travel headrest as claimed in claim 1 further including a web connecting the right side occipital support portion and the left side occipital support portion.

7. The travel headrest as claimed in claim 1 wherein the right side cushion and the left side cushion each include a fabric covering seamed together to define a closed pocket filled with an inflatable bladder.

8. The travel headrest as claimed in claim 7 wherein the inflatable bladder of the right side cushion of the headrest is in fluid communication with the inflatable bladder of the left side cushion of the headrest.

9. The travel headrest as claimed in claim 8 further including a valve disposed between the inflatable bladder of the right side cushion of the headrest and the inflatable bladder of the left side cushion of the headrest.

10. The travel headrest as claimed in claim 1 wherein the right side cushion is substantially kidney shaped and the left side cushion is substantially kidney shaped.

11. The travel headrest as claimed in claim 10 wherein the first longitudinal edge of the right side cushion is a convex edge and the second longitudinal edge of the right side cushion is a concave edge, and wherein the first longitudinal edge of the left side cushion is a convex edge and the second longitudinal edge of the left side cushion is a concave edge.

12. A travel headrest comprising:
a deformable kidney shaped cushion having a concave edge and a convex edge opposite to the concave edge; and
a connection means for retaining the cushion in a deformed configuration wherein the cushion is twisted so that a point on the concave edge of the cushion is connected to a point on the convex edge of the cushion so as to define an occipital support portion and a mandible support portion which extends outwardly from the occipital support portion, the occipital support portion having a front and a rear, and the mandible support portion extending outwardly from the front of the occipital support portion.

13. The travel headrest as claimed in claim 12 wherein the cushion includes a fabric covering seamed together to define a closed pocket filled with a stuffing material.

14. The travel headrest as claimed in claim 12 further including a stiffening pad disposed on the front of the occipital support portion.

15. The travel headrest as claimed in claim 12 further including a non-slip pad disposed on the rear of the occipital support portion.

16. The travel headrest as claimed in claim 12 wherein the cushion includes a fabric covering seamed together to define a closed pocket filled with an inflatable bladder.

17. The travel headrest as claimed in claim 12 wherein the connection means is releasable.

18. A method of constructing a travel headrest, the method comprising the steps of:
providing a deformable kidney shaped cushion having a concave edge and a convex edge opposite to the concave edge;
twisting the cushion into a deformed configuration wherein a point on the concave edge of the cushion is connected to a point on the convex edge of the cushion so as to define an occipital support portion and a mandible support portion which extends outwardly from the occipital support portion; and
securing the point on the concave edge of the cushion to the point on the convex edge of the cushion so as to retain the cushion in the deformed configuration.

\* \* \* \* \*